(12) United States Patent
Tsutsui

(10) Patent No.: US 9,722,860 B2
(45) Date of Patent: Aug. 1, 2017

(54) COMMUNICATION APPARATUS AND WIRELESS COMMUNICATION CONTROL METHOD

(71) Applicant: FUJITSU LIMITED, Kawasaki-shi, Kanagawa (JP)

(72) Inventor: Masafumi Tsutsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 14/948,578

(22) Filed: Nov. 23, 2015

(65) Prior Publication Data

US 2016/0080194 A1 Mar. 17, 2016

Related U.S. Application Data

(63) Continuation of application No. PCT/JP2013/064464, filed on May 24, 2013.

(51) Int. Cl.
*H04L 12/24* (2006.01)
*H04W 16/14* (2009.01)
(Continued)

(52) U.S. Cl.
CPC .......... *H04L 41/0654* (2013.01); *H04L 41/06* (2013.01); *H04L 41/0856* (2013.01);
(Continued)

(58) Field of Classification Search
CPC ............ H04W 16/14; H04W 72/0453; H04W 72/005; H04L 41/0856; H04L 41/06; H04L 41/0654; H04L 67/1034
See application file for complete search history.

(56) References Cited

U.S. PATENT DOCUMENTS

2011/0261764 A1* 10/2011 Shirakata ............ H04W 72/082
370/329
2011/0287802 A1* 11/2011 Ma ........................ H04L 5/0066
455/517
(Continued)

FOREIGN PATENT DOCUMENTS

EP 2 302 964 A1 3/2011
JP 2004-72198 A 3/2004
(Continued)

OTHER PUBLICATIONS

"White Space Devices (WSDs)," RSS-222 Issue 1 DRAFT May 2013.*
(Continued)

*Primary Examiner* — Jae Y Lee
(74) *Attorney, Agent, or Firm* — Myers Wolin, LLC

(57) ABSTRACT

An interface accesses a server for managing usage of a plurality of frequency resources allocated to a first wireless system and acquires information indicating the usage. Based on the acquired information, a control unit selects, amongst the frequency resources, a frequency resource to be used by a second wireless system. The control unit determines whether, after the information is acquired at a first time point, reacquisition of the information at a second time point is successful, which second time point is scheduled to reacquire the information from the server. If the reacquisition is unsuccessful, the control unit allows a frequency resource for the second wireless system to be selected based on the information acquired at the first time point even from the second time point onward.

5 Claims, 12 Drawing Sheets

(51) Int. Cl.
*H04W 72/00* (2009.01)
*H04W 72/04* (2009.01)
*H04L 29/08* (2006.01)

(52) U.S. Cl.
CPC ......... *H04W 16/14* (2013.01); *H04W 72/005* (2013.01); *H04W 72/0453* (2013.01); *H04L 67/1034* (2013.01)

(56) References Cited

U.S. PATENT DOCUMENTS

| | | | | |
|---|---|---|---|---|
| 2014/0105134 | A1* | 4/2014 | Buddhikot | H04W 16/14 370/329 |
| 2015/0156775 | A1* | 6/2015 | Ishikawa | H04W 72/0453 370/329 |
| 2015/0289258 | A1* | 10/2015 | Wu | H04W 16/14 455/501 |

FOREIGN PATENT DOCUMENTS

| | | |
|---|---|---|
| JP | 2012-5068 A | 1/2012 |
| JP | 2012-60470 A | 3/2012 |
| JP | 2012-134650 A | 7/2012 |
| WO | 2010/007743 A1 | 1/2010 |

OTHER PUBLICATIONS

International Search Report issued for corresponding International Patent Application No. PCT/JP2013/064464, mailed Aug. 13, 2013.
Written Opinion of the International Searching Authority for corresponding International Patent Application No. PCT/JP2013/064464, mailed Aug. 13, 2013, with partial English translation.

* cited by examiner

WHITE SPACE TABLE

| AREA NAME | COORDINATES | UNUSED CHANNEL |
|---|---|---|
| A | (LAT.x1N, LON.x1E) – (LAT.x2, LON.x2E) | 42 |
|  |  | 45 |
|  |  | ⋮ |
| B | (LAT.x3N, LON.x3E) – (LAT.x4N, LON.x4E) | 41 |
|  |  | 42 |
|  |  | 44 |
|  |  | ⋮ |
| ⋮ | ⋮ | ⋮ |

CHANNEL FREQUENCY TABLE

| CHANNEL NUMBER | FREQUENCY |
|---|---|
| 41 | 641 MHz (638–644 MHz) |
| 42 | 647 MHz (644–650 MHz) |
| 43 | 653 MHz (650–656 MHz) |
| 44 | 659 MHz (656–662 MHz) |
| 45 | 665 MHz (662–668 MHz) |
| ⋮ | ⋮ |

CHANNEL LIST

| UNUSED CHANNEL | ACQUISITION TIME |
|---|---|
| 41 | 2014/04/01 9:00:05 |
| 42 | |
| 44 | |
| ⋮ | |

FAILURE NOTIFICATION MESSAGE

| FAILURE FLAG | LIST VALID CONDITION | |
|---|---|---|
| 1 | WITHIN 36 HOURS FROM ACQUISITION TIME | 41 |

FIG. 10

COMMUNICATION APPARATUS AND WIRELESS COMMUNICATION CONTROL METHOD

CROSS-REFERENCE TO RELATED APPLICATION

This application is a continuation application of International Application PCT/JP2013/064464 filed on May 24, 2013 which designated the U.S., the entire contents of which are incorporated herein by reference.

FIELD

The embodiments discussed herein are related to a communication apparatus and a wireless communication control method.

BACKGROUND

Various types of wireless systems are currently in use, including television broadcasting systems, cell-phone systems, and wireless local area networks (WLAN). Because frequency resources available across the entire society are limited, it is preferable to enable efficient use of the frequency resources in designing a wireless system. In this view, cognitive radio technology has been proposed that dynamically changes parameters, such as frequencies, according to the wireless environment in its vicinity so as to allow a number of wireless systems to coexist.

The cognitive radio technology provides the capability to share, amongst frequency resources allocated to wireless systems (primary users), frequency resources not in use by the primary users (sometimes referred to as "white spaces") with other wireless systems (secondary users). The secondary users having no license are allowed to use a part of the frequency resources allocated to the primary users as long as they are able to sufficiently avoid interference with wireless devices of the primary users.

In the case of television broadcasting, for example, some physical channels are selected for each broadcast area from a plurality of physical channels allocated for television broadcasting. Therefore, in each broadcast area, a number of unused physical channels exist. In view of this, secondary usage of such unused physical channels (television white spaces) for wireless systems engaged in services other than television broadcasting has been discussed.

A white space database providing information on white spaces is sometimes installed to enable wireless systems identified as secondary users to detect white spaces. For example, a proposed television white space database provides a channel list indicating, amongst a plurality of television broadcasting physical channels, those currently not in use in a broadcast area. The usage of the white space database allows efficient search for a frequency resource sufficiently reducing interference between primary users and the secondary users.

A wireless communication system has been proposed in which a device of a primary user informs a device of a secondary user of frequency ranges allowed to use in the case where the device of the secondary user does not have a function of acquiring channel information indicating white spaces from a database. In addition, a coexistence system has been proposed that allows a secondary user network using white spaces and another wireless communication network using a communication system different from that of the secondary user network to coexist in the same frequency range, which is a white space frequency range.

See, for example, Japanese Laid-open Patent Publications No. 2012-5068 and No. 2012-60470.

In conventional technology, a wireless system operating as a secondary user continually (for example, periodically with a period of a few hours to a day) acquires frequency resource information from a database because frequency resources not in use by primary users may change. Then, when the conventional wireless system fails in reacquiring the frequency resource information at the time the frequency resource information is supposed to be reacquired, the wireless system stops its wireless communication until subsequently succeeding in the reacquisition.

Therefore, according to the conventional technology, when a failure occurs in the database or its peripheral network, disabling access to the database, the secondary usage of frequency resources is not available until the failure is corrected. That is, the database providing the frequency resource information acts as a bottleneck, which decreases the availability of the wireless system as a secondary user.

SUMMARY

According to one embodiment, there is provided a communication apparatus including an interface configured to access a server for managing usage of a plurality of frequency resources by a first wireless system, which frequency resources have been allocated to the first wireless system, and acquire usage information indicating the usage from the server; a storing unit configured to store the acquired usage information; and a control unit configured to select, based on the usage information, a frequency resource to be used by a second wireless system amongst the frequency resources. The control unit determines whether, after the usage information is acquired at a first time point, reacquisition of the usage information at a second time point is successful, which second time point is scheduled to reacquire the usage information from the server. When the reacquisition is unsuccessful, the control unit allows the selecting to be made based on the usage information acquired at the first time point and stored in the storing unit even from the second time point onward.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a white space table;

FIG. 8 illustrates an example of a channel frequency table;

FIG. 9 illustrates an example of a channel list;

FIG. 10 illustrates an example of a failure notification message;

DESCRIPTION OF EMBODIMENTS

Figure 1:
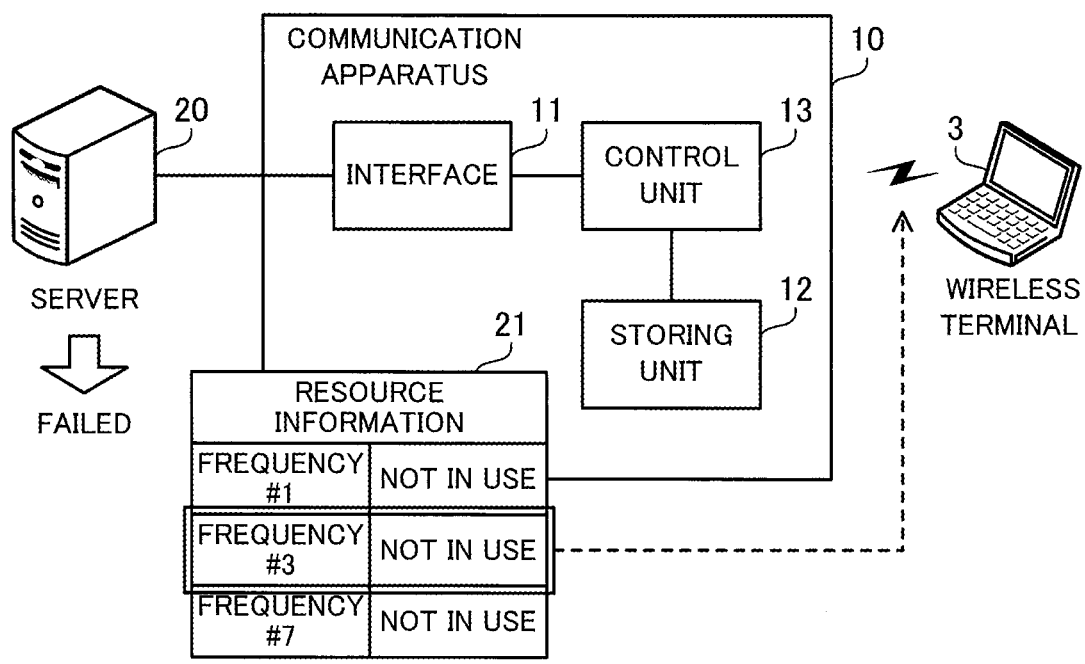
FIG. 1 illustrates a system according to a first embodiment.

Several embodiments will be described below with reference to the accompanying drawings, wherein like reference numerals refer to like elements throughout.

(a) First Embodiment

FIG. 1 illustrates a system according to a first embodiment. The first embodiment is directed to a system in which a second wireless system wirelessly communicates using, amongst frequency resources allocated to a first wireless system, a frequency resource not in use by the first wireless system (also referred to as "white space"). The first wireless system is, for example, a television broadcasting system to which television broadcasting frequency resources are allocated. The second wireless system engages in wireless communication temporarily using a part of the television broadcasting frequency resources, for example, in a comparatively small area such as a school, a commercial complex, an event site, a local shopping area, or a part of a residential neighborhood.

The system of the first embodiment includes a wireless terminal 3, a communication apparatus 10, and a server 20. The wireless terminal 3 is a wireless device belonging to the second wireless system and, for example, a client device for wirelessly communicating with a master device, such as a base station. The communication apparatus 10 dynamically selects a frequency resource to be used by the second wireless system for its wireless communication. The communication apparatus 10 may be a wireless device belonging to the second wireless system, and is, for example, a master device for controlling wireless communication of client devices.

The server 20 is an information processing apparatus for managing the usage of a plurality of frequency resources by the first wireless system, which frequency resources have been allocated to the first wireless system. The server 20 may be provided with a so-called white space database. The server 20 is accessed by the communication apparatus 10 and other communication apparatuses through a network, and provides them with resource information 21 indicating the usage of the frequency resources. The resource information 21 may be a list of frequency resources currently not in use by the first wireless system. The first embodiment is concerned with a case where the occurrence of a failure in the server 20 or its peripheral network disables access of the communication apparatus 10 and other communication apparatuses to the server 20.

The communication apparatus 10 includes an interface 11, a storing unit 12, and a control unit 13. The interface 11 accesses the server 20 via a network, and acquires the resource information 21 from the server 20. In the case where frequency resources not in use by the first wireless system vary from one area to another, the interface 11 may transmit, to the server 20, position information indicating a location of the communication apparatus 10 when accessing the server 20. This allows the communication apparatus 10 to acquire the resource information 21 appropriate to the location of the communication apparatus 10. The interface 11 may be a wired interface connected to a wired network, such as the Internet, or a wireless interface connected to a wireless network.

The storing unit 12 stores therein the resource information 21 acquired from the server 20. In the case where the communication apparatus 10 continually acquires resource information from the server 20, the storing unit 12 may store only the latest resource information acquired last time. Non-volatile memory, such as flash memory, may be used as the storing unit 12, for example.

Based on the resource information 21 acquired from the server 20, the control unit 13 selects a frequency resource to be used by the second wireless system amongst the frequency resources allocated to the first wireless system. For example, the control unit 13 determines the radio conditions of frequency resources currently not in use by the first wireless system, and selects a frequency resource sufficiently reducing interference with the first wireless system and other second wireless systems. The communication apparatus 10 communicates with the wireless terminal 3, for example, using the frequency resource selected by the control unit 13.

In order to realize such radio control, the control unit 13 may be provided with a processor and memory. The processor may be a central processing unit (CPU) or a digital signal processor (DSP), or an electronic circuit designed for specific use, such as an application specific integrated circuit (ASIC) or a field programmable gate array (FPGA). Alternatively, the processor may be a set of multiple processors (multiprocessor). The processor executes a program, for example, stored in memory. An example of the memory is volatile memory, such as random access memory (RAM).

After the resource information 21 is acquired at a first time point, the control unit 13 causes the interface 11 to access the server 20 at a second time point scheduled to reacquire resource information from the server 20. The second time point may be defined as a time point for updating the resource information 21, or a time point at which an initial period of validity of the resource information 21 expires. The second time point is a point in time, for example, after a lapse of a predetermined period (for example, about a few hours to a day) from the first time point.

Subsequently, the control unit 13 determines whether the reacquisition of resource information at the second time point is successful. The access to the server 20 for the reacquisition may be allowed only once, or up to a predetermined number of times. In the case of successful reacquisition, the control unit 13 controls the second wireless system by referring to the reacquired resource information from the second time point onward. On the other hand, in the case of failed reacquisition, the control unit 13 allows the second wireless system to be controlled with reference to the resource information 21 (older resource information) acquired at the first time point and stored in the storing unit 12 even from the second time point onward.

According to the system of the first embodiment, the resource information 21 acquired from the server 20 at the first time point is stored in the storing unit 12 of the communication apparatus 10. Then, even if the resource information reacquisition at the second time point when resource information is supposed to be reacquired results in a failure, the second wireless system is able to secondarily use a frequency resource by using the resource information 21 (older resource information) stored in the storing unit 12. Therefore, even if a failure occurs in the server 20, the second wireless system need not stop its wireless communication. That is, it is possible to reduce the possibility of the second wireless system being inoperative due to the server 20 acting as a bottleneck, which improves the availability of the second wireless system.

(b) Second Embodiment

Figure 2:
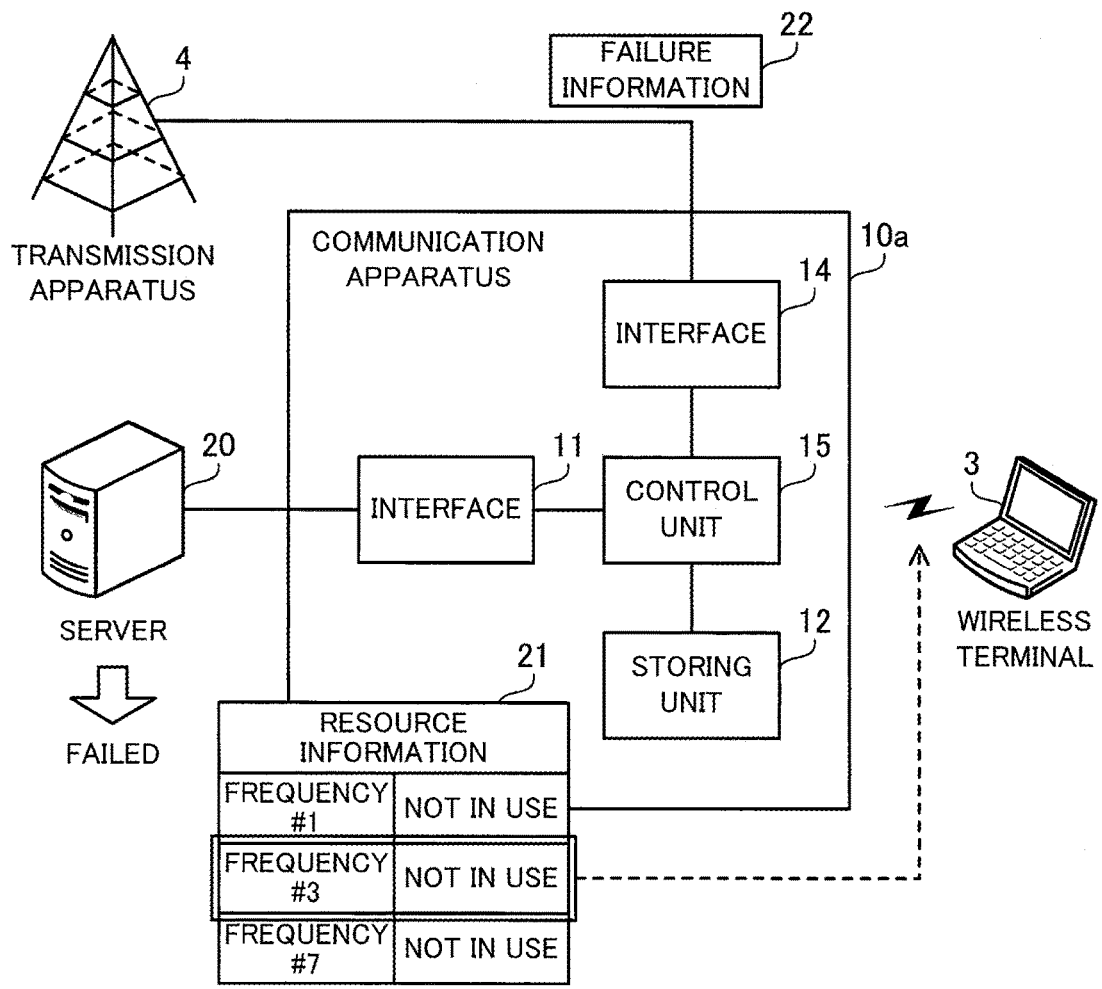
FIG. 2 illustrates a system according to a second embodiment.

A second embodiment is described next. While omitting repeated explanations, the following description focuses on differences from the first embodiment above. FIG. 2 illustrates a system according to the second embodiment. The system of the second embodiment includes the wireless terminal 3, a transmission apparatus 4, a communication apparatus 10a, and the server 20. The communication apparatus 10a corresponds to the communication apparatus 10 of the first embodiment, and controls wireless communication of the second wireless system.

The transmission apparatus 4 transmits failure information 22 indicating the occurrence of a failure to an area in which the communication apparatus 10a resides while the server 20 is experiencing a failure. The transmission apparatus 4 may be a broadcasting station of a television broadcasting system. In this case, the transmission apparatus 4 broadcasts, for example, the failure information 22 to its broadcast area using a data broadcasting service. The transmission apparatus 4 may be a macro base station of a mobile phone system. In this case, the transmission apparatus 4 broadcasts, for example, the failure information 22 to its macrocell using a broadcast channel. Note however that a channel through which the failure information 22 is transmitted may be newly prepared. In addition, the transmission apparatus 4 may be a new communication apparatus not engaged in an existing wireless service.

The communication apparatus 10a includes an interface 14 and a control unit 15 in addition to the interface 11 and the storing unit 12 described in the first embodiment. The control unit 15 corresponds to the control unit 13 of the first embodiment, and is configured to select a frequency resource. The interface 14 receives a signal from the transmission apparatus 4. When a failure has occurred in the server 20, the signal from the transmission apparatus 4 includes the failure information 22. The interface 14 may be a wired interface receiving the signal from the transmission apparatus 4 via a wire, or a wireless interface wirelessly receiving the signal from the transmission apparatus 4. Note that the interface 14 may not have a function of transmitting a signal.

As described above, after the resource information 21 is acquired at the first time point, the control unit 15 causes the interface 11 to access the server 20 at the second time point scheduled to reacquire resource information from the server 20. Subsequently, the control unit 15 determines whether the reacquisition of resource information at the second time point is successful. In the case of successful reacquisition, the control unit 15 selects a frequency resource to be used by the second wireless system by referring to the reacquired resource information from the second time point onward.

On the other hand, in the case of failed reacquisition, the control unit 15 determines whether the failure information 22 indicating the occurrence of a failure in the server 20 has been received from the transmission apparatus 4. The reception of the failure information 22 may be checked after the failed reacquisition, or continually checked regardless of the success or failure in the reacquisition. When the reacquisition has failed and the failure information 22 has been received, the control unit 15 allows a frequency resource to be selected with reference to the resource information 21 acquired at the first time point and stored in the storing unit 12 even from the second time point onward. When the reacquisition has failed and the failure information 22 has not been received, the control unit 15, for example, selects no frequency resource and stops wireless communication of the second wireless system.

The system of the second embodiment achieves the same effect as the system of the first embodiment. In addition, according to the system of the second embodiment, whether the failed reacquisition of the resource information is attributable to a failure in the server 20 is determined based on a signal received from the transmission apparatus 4. In the case where the server 20 is experiencing a failure, it is less likely that the usage of frequency resources managed by the server 20 changes. In addition, when the server 20 is experiencing a failure, other communication apparatuses are expected to have also failed in reacquiring the resource information as in the case with the communication apparatus 10a and act in the same manner as the communication apparatus 10a. Therefore, the communication apparatus 10a is able to efficiently find a frequency resource sufficiently reducing interference with the first wireless system and other second wireless systems by referring to even the previously acquired resource information 21.

(c) Third Embodiment

Figure 3:
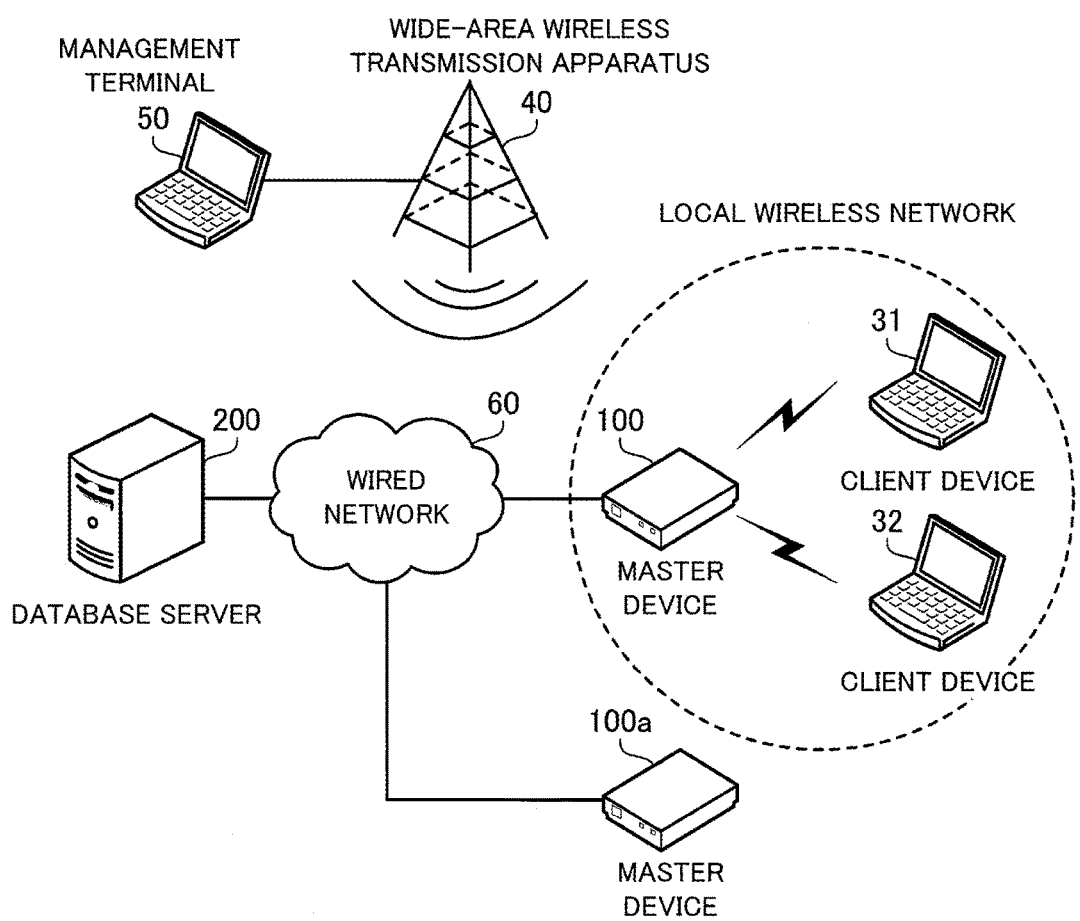
FIG. 3 illustrates a system according to a third embodiment.

FIG. 3 illustrates a system according to a third embodiment. The system of the third embodiment has a television broadcasting system as a primary user and local wireless networks as secondary users. Each of the local wireless networks engages in wireless communication temporarily using a television broadcasting frequency in a relatively small area compared to a broadcast area covered by a single broadcast station and a macrocell covered by a single macro base station. Examples of such a local wireless network include a network for broadcasting to a small area, such as a school, a local shopping area, or a part of a residential neighborhood (area limited broadcasting) and a network for transmitting sounds of microphones at a site people gather, such as a commercial complex or an event site (specified radio microphone). Further examples of the local wireless network include a network for reporting environmental conditions measured by a sensing device (sensor network) and an extra communications infrastructure prepared in case of disasters (communication system for disasters).

The system of the third embodiment includes client devices 31 and 32, a wide-area wireless transmission apparatus 40, a management terminal 50, a wired network 60, master devices 100 and 100a, and a database server 200. The client devices 31 and 32 are examples of the wireless terminal 3 of the first and second embodiments. The wide-area wireless transmission apparatus 40 is an example of the transmission apparatus 4 of the second embodiment. The master devices 100 and 100a are examples of the communication apparatus 10 of the first embodiment, and also examples of the communication apparatus 10a of the second embodiment. The database server 200 is an example of the server 20 of the first and second embodiment.

The client devices 31 and 32 are wireless devices connected to one of the master devices to take part in the local wireless network. Assume in the third embodiment that the client devices 31 and 32 are connected to the master device 100. The client devices 31 and 32 may be fixed wireless communication apparatuses, or mobile wireless communication apparatuses. Each of the client devices 31 and 32 is, for example, a terminal operated by a user, such as a mobile phone, a tablet computer, or a notebook computer.

The wide-area wireless transmission apparatus 40 is a wireless transmission apparatus capable of broadcasting a failure notification message to be described later to a widespread area. The wide-area wireless transmission apparatus 40 covers a plurality of local wireless networks controlled by a plurality of master devices. As the wide-area wireless transmission apparatus 40, a broadcast station of a television broadcasting system or a macro base station of a mobile phone system may be used, for example. The failure notification message is transmitted, for example, through an existing broadcast channel.

The management terminal 50 is an information processor which is a terminal operated by an administrator of the database server 200. When a failure occurs in the database server 200 or its peripheral network and access to the database server 200 from any of the master devices is disabled, the administrator recognizes the occurrence of a failure. Conceivable failures associated with the database server 200 are a hardware malfunction of the database server 200, abnormal stop of software running on the database server 200, loss of data, a trouble in a communication apparatus connected to the database server 200, and the like. When the administrator recognizes the occurrence of a failure, the management terminal 50 instructs the wide-area wireless transmission apparatus 40 to broadcast a failure notification message. The failure notification message is continually broadcast until the failure is corrected.

The master devices 100 and 100a are wireless devices each capable of establishing and controlling a local wireless network. The master devices 100 and 100a are individually connected to the wired network 60, and access the database server 200 via the wired network 60. The wired network 60 is, for example, the Internet. Each of the master devices 100 and 100a receives access from one or more client devices and wirelessly communicates with the client devices. That is, the master devices 100 and 100a operate as base stations of their local wireless networks.

The database server 200 is a server provided with a white space database for television broadcasting and connected to the wired network 60. The white space database manages mappings between broadcast areas and frequency resources not in use by the television broadcasting system (television white spaces). In response to access from each of the master devices 100 and 100a, the database server 200 provides information on television white spaces corresponding to a broadcast area in which the access-source master device resides.

Figure 4:
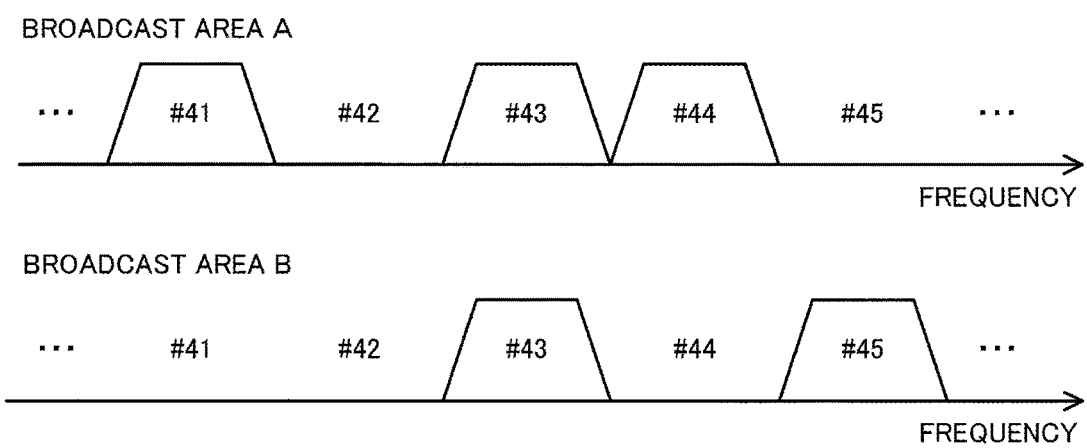
FIG. 4 illustrates an example of white spaces.

FIG. 4 illustrates an example of white spaces. In the television broadcasting system of the third embodiment, a frequency range allocated to television broadcasting is preliminarily divided into a plurality of physical channels. All the physical channels may have the same bandwidth. For example, a frequency range from 470 MHz to 710 MHz is divided into physical channels #13 to #52, each of which has a bandwidth of 6 MHz.

An area covered by the television broadcasting system is divided into a plurality of broadcast areas. Amongst the physical channels, physical channels in use and not in use for broadcasting vary for each broadcast area. For example, in Broadcast Area A, the physical channels #41, #43, and #44 are in use and the physical channels #42 and #45 are not in use. On the other hand, for example, in Broadcast Area B, the physical channels #43 and #45 are in use and the physical channels #41, #42, and #44 are not in use.

That is, the physical channels #42 and #45 are television white spaces in Broadcast Area A, and the physical channels #41, #42, and #44 are television white spaces in Broadcast Area B. Each of the master devices 100 and 100a may communicate wirelessly with the client devices 31 and 32 using the frequency resources of the physical channels #42 and #45 when the master device resides in Broadcast Area A. On the other hand, each of the master devices 100 and 100a may communicate wirelessly with the client devices 31 and 32 using the frequency resources of the physical channels #41, #42, and #44 when the master device resides in Broadcast Area B.

Figure 5:
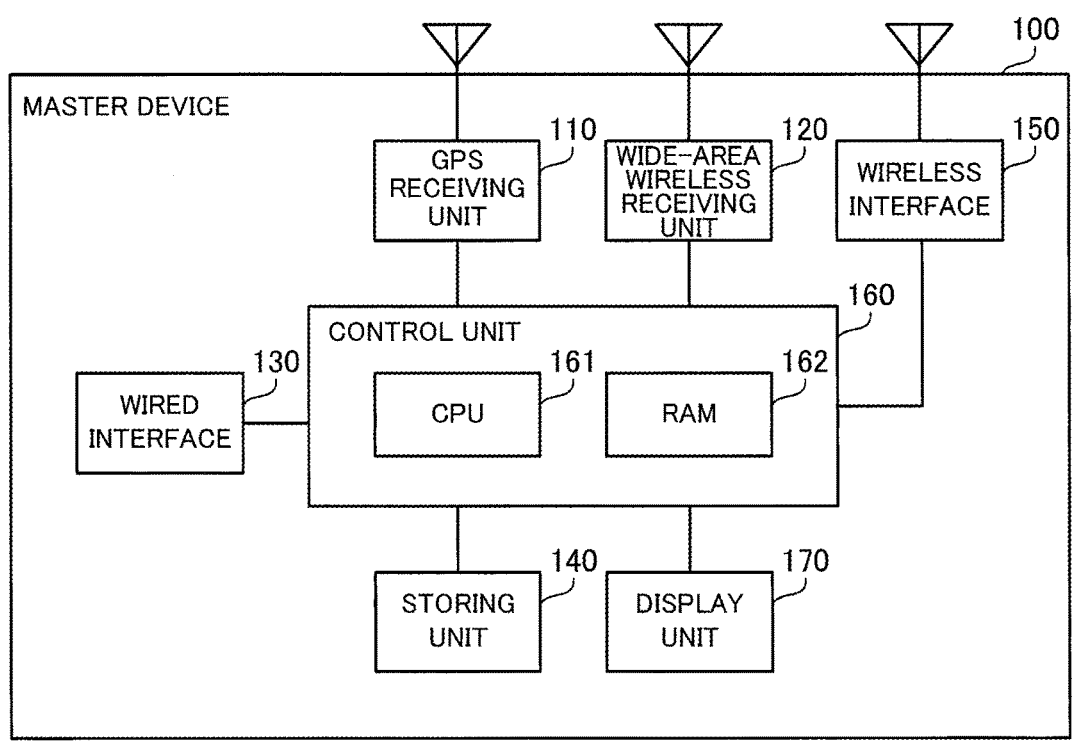
FIG. 5 is a block diagram illustrating an example of a master device.

FIG. 5 is a block diagram illustrating an example of a master device. The master device 100 includes a global positioning system (GPS) receiving unit 110, a wide-area wireless receiving unit 120, a wired interface 130, a storing unit 140, a wireless interface 150, a control unit 160, and a display unit 170. The master device 100a may be implemented using the same block configuration as the master device 100.

The GPS receiving unit 110 is a wireless interface for calculating the current position of the master device 100 using a GPS. Using a GPS antenna, the GPS receiving unit 110 receives, from each of a plurality of GPS satellites, a GPS signal including the time of its transmission from the GPS satellite. Then, based on the transmission times of the GPS satellites and corresponding reception times indicated by an internal clock of the master device 100, the GPS receiving unit 110 calculates the latitude and longitude of the current position of the master device 100. Note that the third embodiment employs a GPS but the master device 100 may calculate the current position of the master device 100 by a different method.

The wide-area wireless receiving unit 120 is a wireless interface for receiving a wireless signal from the wide-area wireless transmission apparatus 40. The wide-area wireless receiving unit 120 may not have a function of transmitting a wireless signal. The wide-area wireless receiving unit 120 checks whether a failure notification message is included in the wireless signal sent from the wide-area wireless transmission apparatus 40, and extracts the failure notification message if it is included. In the case where the wide-area wireless transmission apparatus 40 is a broadcast station, for example, the wide-area wireless receiving unit 120 searches data of a data broadcasting service for a failure notification message. On the other hand, in the case where the wide-area wireless transmission apparatus 40 is a macro base station, for example, the wide-area wireless receiving unit 120 searches a broadcast channel for a failure notification message.

The wired interface 130 is a communication interface connected to the wired network 60. The wired interface 130 periodically accesses the database server 200 via the wired network 60 according to a schedule controlled by the control unit 160. At this time, the wired interface 130 transmits, to the database server 200, position information indicating the position calculated by the GPS receiving unit 110. Then, the wired interface 130 receives a channel list indicating television white spaces of a broadcast area in which the master device 100 resides from the database server 200 in response to the access. Note that the position information transmitted to the database server 200 may include the latitude and longitude of the master device 100, or an identifier of a broadcast area identified by the latitude and longitude.

The storing unit 140 is non-volatile memory, such as flash memory, storing data and programs to be used by the control unit 160. The storing unit 140 stores therein the channel list acquired from the database server 200. The channel list has an acquisition time at which the master device 100 acquired the channel list. Only the latest channel list acquired from the database server 200 last time may be stored in the storing unit 140. In this case, an older channel list is deleted from the storing unit 140. The storing unit 140 also stores channel frequency information indicating a frequency of each physical channel of television broadcasting. In addition, the storing unit 140 may preliminarily store programs for controlling the local wireless network.

The wireless interface 150 is a communication interface for wirelessly communicating with the client devices 31 and 32. Upon receipt of a request from the control unit 160 to measure interference, with designation of a frequency range, the wireless interface 150 measures reception levels of wireless signals transmitted from the primary user and other secondary users in the designated frequency range. In addition, when a frequency for secondary usage is designated by the control unit 160, the wireless interface 150 configures radio frequency (RF) transmitting and receiving circuits, and designates the frequency to the client devices 31 and 32. Then, the wireless interface 150 functions as a base station of the local wireless network, and transmits and receives data to and from the client devices 31 and 32.

The control unit 160 controls frequencies used by the local wireless network. The control unit 160 generates position information indicating the current position calculated by the GPS receiving unit 110, and transmits the position information to the database server 200 via the wired interface 130. The control unit 160 acquires a channel list corresponding to the current position from the database server 200, and stores the channel list in the storing unit 140 after adding the acquisition time thereto. A predetermined period of time (for example, about a few hours to a day) is set for the acquired channel list as an initial period of validity. The control unit 160 reacquires a channel list each time the initial period of validity elapses.

In addition, with reference to the acquired channel list, the control unit 160 selects one or more physical channels not in use for broadcasting in the broadcast area in which the master device 100 resides. Because white spaces are common frequency resources and are likely to be used by other secondary users, the control unit 160 measures interference in the frequency range of each of the selected physical channels, using the wireless interface 150. Based on the measurement results, the control unit 160 determines a frequency sufficiently reducing interference with the primary users and other secondary users as a frequency to use for the local wireless network and informs the wireless interface 150 of the determined frequency. It is preferable that the frequency determination be made continually during the local wireless network being in operation, but then, if not, at least when a channel list is reacquired.

The control unit 160 also controls operation of the master device 100 when the master device 100 is not able to acquire a channel list from the database server 200. Causes of not being able to acquire a channel list are classified into failures associated with the database server 200 and the rest. In the former case, all master devices receiving a channel list from the database server 200 are not able to acquire the channel list. On the other hand, in the latter case, master devices other than the master device 100 are potentially able to normally acquire a channel list. Therefore, the control unit 160 controls the operation of the master device 100 in the following manner.

That is, when having failed to access the database server 200, the control unit 160 determines whether the wide-area wireless transmission apparatus 40 has broadcast a failure notification message (i.e., whether the wide-area wireless receiving unit 120 has received the failure notification message). The failure notification message is continually broadcast while the database server 200 is experiencing a failure. In the case where the failure notification message has been received, the control unit 160 allows a channel list acquired last time and stored in the storing unit 140 to be used. This is, in other words, the control unit 160 extends the period of validity of the previously acquired channel list. On the other hand, if no failure notification message has been received, the control unit 160 stops wireless communication of the local wireless network.

The control unit 160 includes a CPU 161 and RAM 162. The CPU 161 loads at least part of data and programs stored in the storing unit 140 into the RAM 162 and then runs the programs stored in the RAM 162. Note however that the control unit 160 may be provided with a different type of processor other than a CPU, or may be provided with a set of multiple processors (multi-processor). In addition, the above-described functions of the control unit 160 may be implemented, not by a versatile processor such as a CPU, but as hardware logic.

The display unit 170 displays thereon operating status of the local wireless network. The display unit 170 may be a lamp lighting in one or more colors. In the case where the master device 100 has failed to access the database server 200 and is wirelessly communicating based on an older channel list, the display unit 170 indicates accordingly. For example, when an older channel list is being used, the display unit 170 lights up in a color different from that used when the master device 100 has succeeded in accessing the database server 200. In this manner, a warning is given to a user of the master device 100. Note however that a message indicating that an older channel list is being used may be sent to predetermined terminals using the Simple Network Management Protocol (SNMP).

Note that the wired interface 130 is an example of the interface 11 of the first and second embodiments. The wide-area wireless receiving unit 120 is an example of the interface 14 of the second embodiment. The storing unit 140 is an example of the storing unit 12 of the first and second embodiments. The control unit 160 is an example of the control unit 13 of the first embodiment and the control unit 15 of the second embodiment.

Figure 6:
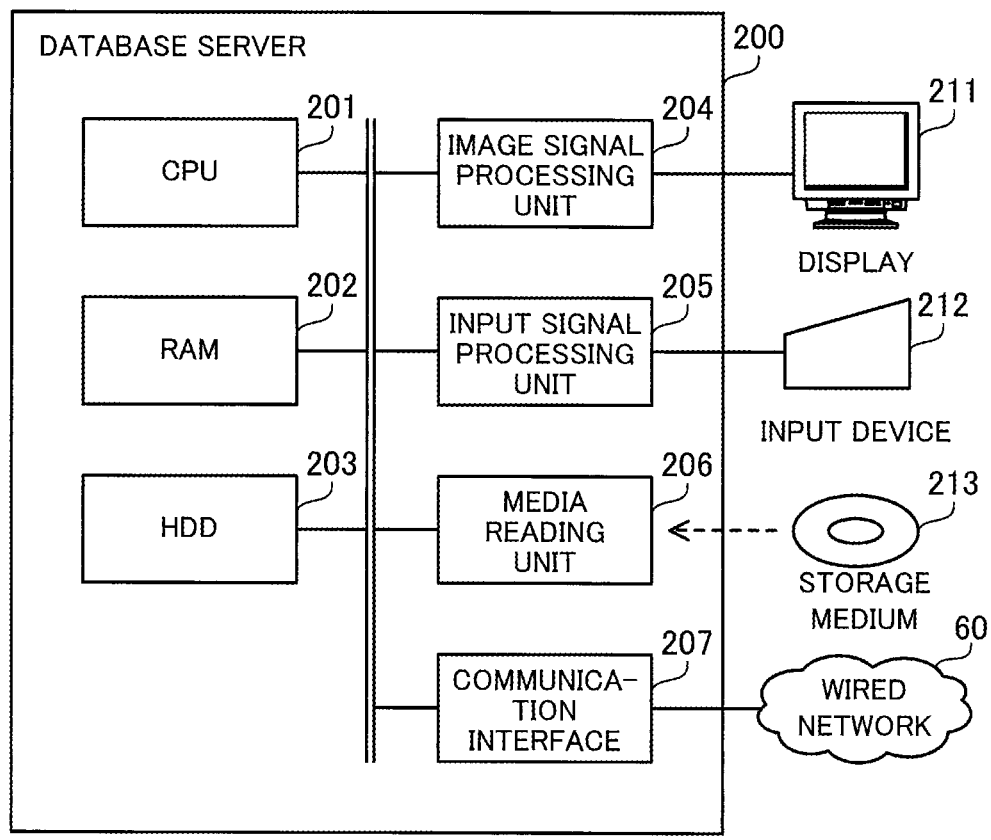
FIG. 6 is a block diagram illustrating an example of a database server.

FIG. 6 is a block diagram illustrating an example of a database server. The database server 200 includes a CPU 201, RAM 202, a hard disk drive (HDD) 203, an image signal processing unit 204, an input signal processing unit 205, a media reading unit 206, and a communication interface 207. These units are connected to a bus in the database server 200 and configured to mutually transmit signals. The management terminal 50 may be implemented using a similar block configuration as the database server 200.

The CPU 201 is a processor for executing program instructions. The CPU 201 loads at least part of programs and data stored in the HDD 203 into the RAM 202 and then runs the programs. Note that the CPU 201 may include a plurality of processor cores, and the database server 200 may include a plurality of processors. Then, processes described below may be run in parallel using the processors or processor cores. The RAM 202 is volatile memory for temporarily storing therein programs to be executed by the CPU 201 and data to be used for information processing. Note that the database server 200 may be provided with a different type of memory other than RAM, or may be provided with a plurality of types of memory devices.

The HDD 203 is a non-volatile storage device to store therein software programs, such as an operating system (OS) and application software, and data. Note that the database server 200 may be provided with a different type of non-volatile storage device, such as a solid state drive (SSD), or may be provided with a plurality of types of non-volatile storage devices. The image signal processing unit 204 outputs an image to a display 211 connected to the database server 200 according to an instruction from the CPU 201. As the display 211, a cathode ray tube (CRT) display, a liquid crystal display (LCD), a plasma display panel (PDP), or an organic electro-luminescence display (GELD) may be used, for example. The input signal processing unit 205 acquires an input signal from an input device 212 connected to the database server 200 and sends the input signal to the CPU 201. Various types of input devices including the following may be used as the input device 212: a pointing device, such as a mouse, a touch panel, a touch-pad, or a trackball; a keyboard; a remote controller; and a button switch. In addition, the database server 200 may be provided with a plurality of types of input devices.

The media reading unit 206 is a drive unit for reading programs and data recorded on a storage medium 213. As the storage medium 213, any of the following may be used: a magnetic disk, such as a flexible disk (FD) or a HDD; an optical disk, such as a compact disc (CD) or a digital versatile disc (DVD); a magneto-optical disk (MO); and a semiconductor memory. The media reading unit 206 stores programs and data, for example, read from the storage medium 213 in the RAM 202 or the HDD 203. Note that the database server 200 may be provided with a plurality of media reading units corresponding to a plurality of types of storage media. The communication interface 207 is a wired interface connected to the wired network 60, and communicates with the master devices 100 and 100a.

Note however that the database server 200 may not be provided with the media reading unit 206, and further may not be provided with the image signal processing unit 204 and the input signal processing unit 205 in the case where the database server 200 is controllable by a terminal via a network. In addition, the display 211 and the input device 212 may be integrally provided on the chassis of the database server 200.

FIG. 7 illustrates an example of a white space table. A white space table 221 is stored in a storage device (for example, the HDD 203) of the database server 200. The content of the white space table 221 is updated when the usage of physical channels by the television broadcasting system has changed. The white space table 221 has columns of area name; coordinates; and unused channel.

Each field in the area name column contains the identifier of a broadcast area. Each field in the coordinates column contains information representing the range of the corresponding broadcast area using latitudes and longitudes. In the unused channel column, the numbers of physical channels not in use for broadcasting in the corresponding broadcast area are enumerated. Note that, in order to acquire a channel list, each of the master devices 100 and 100a may transmit the latitude and longitude coordinates calculated using a GPS to the database server 200. In addition, the master devices 100 and 100a may individually determine a broadcast area based on the latitude and longitude coordinates and then transmit the identifier of the broadcast area to the database server 200. In this case, information mapping between area names and coordinates is stored in the master devices 100 and 100a.

For example, for an area name of A, information indicating the latitude and longitude range of the area and unused channels {42, 45, . . . } is registered in the white space table 221. For an area name of B, information indicating the latitude and longitude range of the area and unused channels {41, 42, 44, . . . } is registered in the white space table 221.

FIG. 8 illustrates an example of a channel frequency table. A channel frequency table 141 is stored in the storing unit 140 of the master device 100. The channel frequency table 141 has columns of channel number and frequency. Each field of the channel number column contains the number of a physical channel preliminarily defined for television broadcasting. Each field of the frequency column contains at least one of the center frequency or frequency range of the corresponding physical channel. If all the physical channels have the same bandwidth, the master device 100 is able to calculate the frequency range of each physical channel based on its center frequency.

For example, for a channel number of 41, information indicating a frequency of 641 MHz (or 638 to 644 MHz) is registered in the channel frequency table 141 in advance. For a channel number of 42, information indicating a frequency of 647 MHz (or 644 to 650 MHz) is registered in the channel frequency table 141 in advance. Note that frequency separation between two neighboring physical channels may be sufficiently small. Even if neighboring physical channels are used, interference between the physical channels is sufficiently reduced in the case where broadcast data is transmitted in digital form.

FIG. 9 illustrates an example of a channel list. A channel list 142 is stored in the storing unit 140 of the master device 100 by the control unit 160. Each channel list transmitted from the database server 200 to the master device 100 enumerates numbers of unused physical channels in a broadcast area in which the master device 100 resides. To each acquired channel list, the control unit 160 adds the time of the channel list being acquired by the master device 100 (acquisition time). Note that only one channel list acquired last time may be stored in the storing unit 140.

FIG. 10 illustrates an example of a failure notification message. During access to the database server 200 being disabled, the failure notification message 41 is broadcast by the wide-area wireless transmission apparatus 40 and then received by the master devices 100 and 100a. The failure notification message 41 has fields of failure flag and list valid condition. The failure flag field contains the bit indicating whether the database server 200 is experiencing a failure. For example, a failure flag of 0 indicates no failure, and a failure flag of 1 indicates the occurrence of a failure. The list valid condition field contains the condition under which the master devices 100 and 100a are allowed to continue to use a channel list.

The list valid condition may include a condition associated with the acquisition time. For example, when the list valid condition reads "within 36 hours from the acquisition time", a channel list acquired earlier than 36 hours is not allowed for continued use. In other words, the period of validity of the channel list is changed by the failure notification message 41. Setting a condition associated with the acquisition time prevents an old channel list generated before the usage of physical channels is changed from being continually used.

Note that in the case where a failure in the database server 200 affects only some of a plurality of broadcast areas, the failure notification message 41 may be broadcast only to the affected broadcast areas. In addition, the failure notification message 41 may include information indicating target broadcast areas. The content of the failure notification message 41 may vary for one broadcast area to another. For example, in the case where one broadcast area has recently undergone changes in the usage of physical channels but a different broadcast area lately has no changes in the usage, the failure notification message 41 having a different list valid condition may be broadcast to each of the two broadcast areas.

In the case where there are sufficient wireless resources allocatable to the failure notification message 41 by the wide-area wireless transmission apparatus 40, the failure notification message 41 may include information on white spaces. For example, the failure notification message 41 may include a limited channel list indicating only a part of unused physical channels, such as numbers of physical channels not in use in a plurality of neighboring broadcast areas. In that case, the master devices 100 and 100a determine a frequency to be used by referring also to the white space information included in the failure notification message 41.

Figure 11:
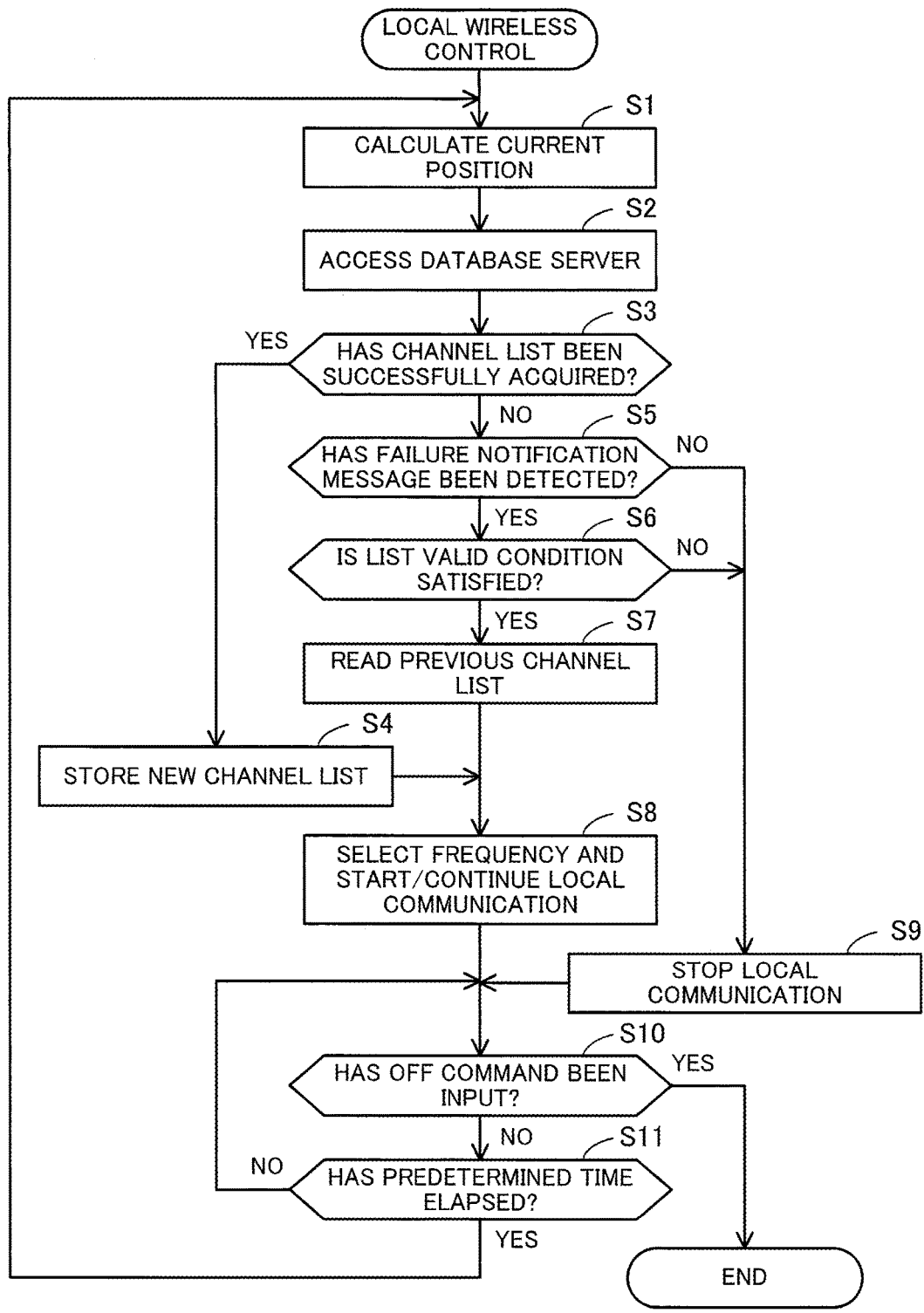
FIG. 11 is a flowchart illustrating an example of a procedure for local wireless control.

FIG. 11 is a flowchart illustrating an example of a procedure for local wireless control. The procedure is described here with the case where the master device 100 performs local wireless control. Note that other master devices perform local wireless control similar to that of the master device 100. The procedure of the flowchart starts in response to the master device 100 being powered on or an input of an ON command to start local wireless communication.

[Step S1] The GPS receiving unit 110 receives a GPS signal and calculates the current position of the master device 100. The current position is identified, for example, by latitude and longitude.

[Step S2] The control unit 160 generates position information indicating the current position calculated using a GPS. The position information may include latitude and longitude coordinates or an identifier of a broadcast area including the current position. The wired interface 130 transmits the position information to the database server 200 via the wired network 60. Note that the control unit 160 preferably knows in advance an address, such as a Uniform Resource Locator (URL) or an Internet Protocol (IP) address, as information to access the database server 200.

[Step S3] The control unit 160 determines whether a channel list corresponding to the position information has been acquired from the database server 200 in response to the access to the database server 200. In the case where no response is received in the first attempt, access to the database server 200 may be attempted a plurality of times (up to a predetermined number of times). If a channel list is successfully acquired, the process moves to step S4. If the acquisition of a channel list is failed, the process moves to step S5.

[Step S4] The control unit 160 adds the acquisition time to the channel list that the wired interface 130 has received from the database server 200. Then, the control unit 160 stores the channel list in the storing unit 140. At this time, the control unit 160 deletes an older channel list from the storing unit 140. Subsequently, the process moves to step S8.

[Step S5] The control unit 160 determines whether the wide-area wireless receiving unit 120 has detected the failure notification message 41 indicating the occurrence of a failure (for example, the failure notification message 41 with the failure flag set to 1) from a wireless signal transmitted by the wide-area wireless transmission apparatus 40. The detection of the failure notification message 41 may be attempted either before or after unsuccessful acquisition of a channel list. If the failure notification message 41 indicating the occurrence of a failure has been detected, the process moves to step S6. If not, the process moves to step S9.

[Step S6] The control unit 160 determines whether the channel list 142 acquired last time and stored in the storing unit 140 satisfies the list valid condition included in the failure notification message 41. For example, based on the acquisition time of the stored channel list 142 and the acquisition time condition included in the list valid condition, the control unit 160 determines whether the channel list 142 is too old for continued use. If the list valid condition is satisfied, the process moves to step S7. If not, the process moves to step S9.

[Step S7] The control unit 160 reads the channel list 142 from the storing unit 140.

[Step S8] The control unit 160 selects one or more unused physical channels by referring to the new channel list acquired from the database server 200 or the old channel list 142 stored in the storing unit 140. With reference to the channel frequency table 141, the control unit 160 checks the frequencies of the selected physical channels. The wireless interface 150 measures, in the frequency range of each of the selected physical channels, reception levels (interference levels) of wireless signals transmitted from the television broadcasting system and other local wireless networks. Then, the control unit 160 determines a frequency with the minimum interference as a frequency for the local wireless network. This allows wireless communication between the master device 100 and the client devices 31 and 32 to start or continue. Subsequently, the process moves to step S10.

[Step S9] The control unit 160 stops wireless communication of the local wireless network, including wireless communication between the master device 100 and the client devices 31 and 32.

[Step S10] The control unit 160 determines whether the master device 100 has been powered off or an OFF command to end the wireless communication has been input. If an OFF command has been input, the control unit 160 ends the local wireless control. If an OFF command has not been input, the process moves to step S11.

[Step S11] The control unit 160 determines if a predetermined period of time (for example, about a few hours to a day) has elapsed after the latest attempt to access the database server 200. The periodic time interval to acquire the latest channel list from the database server 200 is predefined in the master device 100. After the predetermined period of time has elapsed, the process moves to step S1 to attempt reacquisition of a channel list from the database server 200. If the predetermined period of time has yet to elapse, the process moves to step S10 to wait for an input of an OFF command or the predetermined period of time to elapse.

Figure 12:
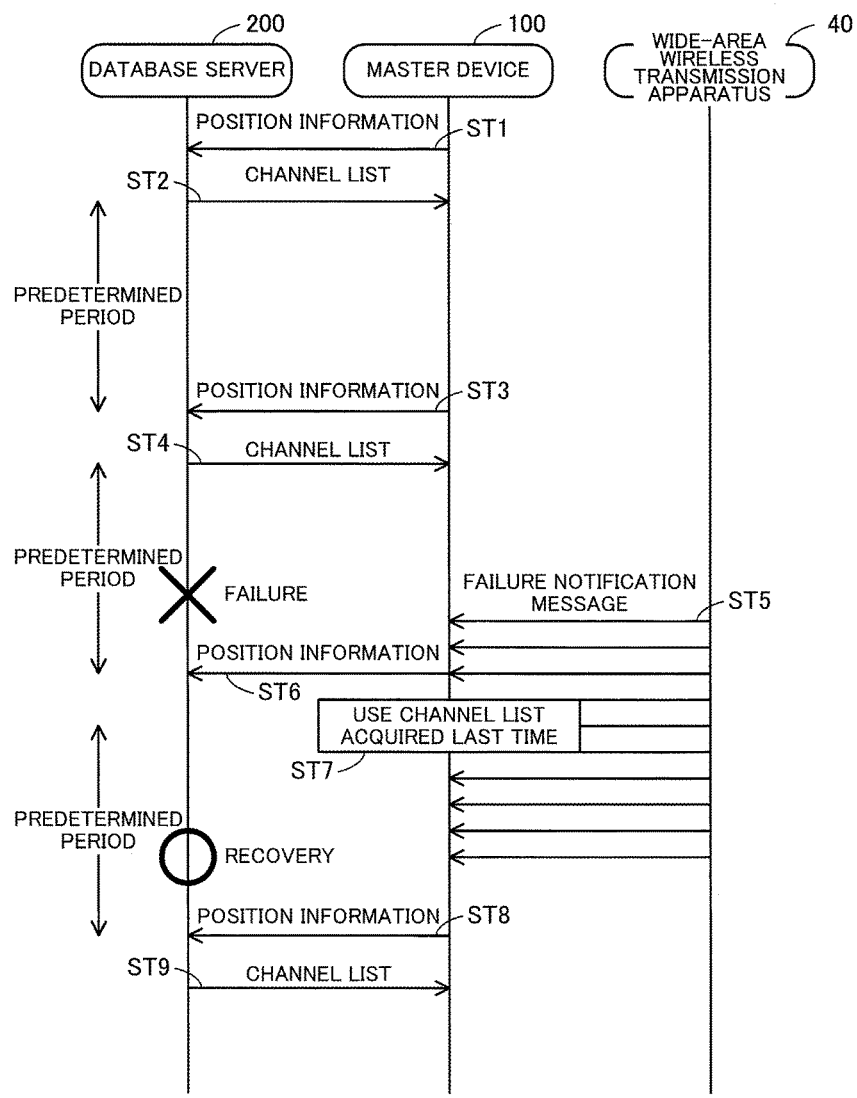
FIG. 12 is a sequence diagram illustrating an example of a flow of database access.

FIG. 12 is a sequence diagram illustrating an example of a flow of database access. The master device 100 transmits position information indicating the current position of the master device 100 to the database server 200 (ST1). The database server 200 transmits, to the master device 100, a channel list corresponding to the current position of the master device 100 (ST2). The master device 100 controls the local wireless network using the channel list. When a predetermined period of time has elapsed after the last acquisition of the channel list, the master device 100 transmits the position information again to the database server 200 (ST3). The database server 200 transmits the latest channel list to the master device 100 (ST4). The master device 100 controls the local wireless network using the latest channel list.

Assume that a failure occurs in the database server 200 at this point. For example, assume that the database server 200 stops working due to hardware failure of the database server 200. Then, an administrator of the database server 200 recognizes the occurrence of the failure. The wide-area wireless transmission apparatus 40 continually broadcasts the failure notification message 41 (ST5). For example, the wide-area wireless transmission apparatus 40 continues to transmit the failure notification message 41 at a predetermined period.

When a predetermined period of time has elapsed after the last acquisition of the channel list, the master device 100 transmits the position information again to the database server 200 (ST6). However, because the database server 200 is experiencing a failure, the master device 100 is not able to receive a response from the database server 200. Then, the master device 100 acknowledges that the failure notification message 41 is being broadcast by the wide-area wireless transmission apparatus 40. Subsequently, the master device 100 controls the local wireless network by continually using the channel list acquired last time from the database server 200 (ST7). That is, the master device 100 continually causes the local wireless network to operate without stopping the wireless communication.

Assume that the database server 200 subsequently recovers from the failure. For example, the database server 200 resumes its operation after the failed hardware is replaced. Then, the administrator of the database server 200 recognizes the recovery of the database server 200. The wide-area wireless transmission apparatus 40 stops broadcasting the failure notification message 41.

When a predetermined period of time has elapsed after the last attempt to acquire a channel list, the master device 100 transmits the position information again to the database server 200 (ST8). In response, the database server 200 transmits the latest channel list to the master device 100 since the database server 200 has recovered at this point in time (ST9). The master device 100 controls the local wireless network using the latest channel list.

According to the system of the third embodiment, a channel list provided by the database server 200 is stored in the master devices 100 and 100a. Then, even if having failed in reacquiring a channel list at the time the channel list is supposed to be reacquired, the master devices 100 and 100a are individually allowed to control the frequencies of their local wireless networks by continuing to use the channel list acquired last time. In this manner, it is possible to prevent all of a plurality of local wireless networks from becoming unusable even if a failure occurs in the database server 200. That is, the system of the third embodiment improves the availability of the local wireless networks secondarily using television broadcasting frequency resources.

In addition, whether failed reacquisition of a channel list is attributable to a failure in the database server 200 is determined by receiving the failure notification message 41 broadcast by the wide-area wireless transmission apparatus 40. In the case where the database server 200 is experiencing a failure, it is less likely that the white space database is updated. In addition, when a master device continues to use a channel list acquired last time, it is likely that other master devices also continue to use channel lists acquired last time. Thus, a plurality of master devices using common white spaces are expected to act in the same manner. Therefore, even with the channel list acquired last time, each master device is expected to be able to efficiently find a frequency with small interference.

Note that the information processing of the wireless terminal 3, the communication apparatuses 10 and 10a, the server 20, the client devices 31 and 32, the management terminal 50, the master devices 100 and 100a, and the database server 200 may be implemented by causing each of these apparatuses to execute a program. The program may be recorded in a computer-readable storage medium. Examples of such a storage medium include a magnetic disk, an optical disk, a magneto-optical disk, and a semiconductor memory. Examples of the magnetic disk are a FD and a HDD. Examples of the optical disk are a CD, CD-recordable (CD-R), CD-rewritable (CD-RW), DVD, DVD-R, and DVD-RW. The program may be recorded in portable storage media and then distributed. In that case, each of the above-mentioned apparatuses may copy the program from a portable storage medium to a different storage medium, such as a HDD, and execute the program.

According to one aspect, it is possible to improve the availability of a wireless system secondarily using a frequency resource.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication apparatus comprising:
   an interface configured to access a server for managing usage of a plurality of frequency resources by a first wireless system, which frequency resources have been allocated to the first wireless system, and acquire usage information indicating the usage from the server;
   a storing unit configured to store the acquired usage information; and
   a control unit configured to select, based on the usage information, a frequency resource to be used by a second wireless system amongst the frequency resources,
   wherein the control unit determines whether, after the usage information is acquired at a first time point, reacquisition of the usage information at a second time point is successful, the second time point being scheduled to reacquire the usage information from the server, and
   when the reacquisition is unsuccessful, the control unit allows the selecting to be made based on the usage information acquired at the first time point and stored in the storing unit even from the second time point onward.

2. The communication apparatus according to claim 1, further comprising:
   a different interface configured to receive failure information from a transmission apparatus for transmitting the failure information when the server is experiencing a failure,
   wherein, according to receiving status of the failure information, the control unit determines whether to make the selecting based on the usage information acquired at the first time point even from the second time point onward.

3. The communication apparatus according to claim 2, wherein:
the failure information includes an acquisition time condition of the usage information; and
when the failure information has been received and the first time point satisfies the acquisition time condition, the control unit makes the selecting based on the usage information acquired at the first time point even from the second time point onward.

4. The communication apparatus according to claim 2, wherein:
the transmission apparatus is a wireless transmission apparatus for broadcasting the failure information when the server is experiencing the failure, and the different interface is a wireless interface for receiving the failure information broadcast by the wireless transmission apparatus.

5. A wireless communication control method executed by a communication apparatus, the wireless communication control method comprising:

accessing a server for managing usage of a plurality of frequency resources by a first wireless system, which frequency resources have been allocated to the first wireless system, and acquiring usage information indicating the usage from the server at a first time point;

selecting, based on the usage information acquired at the first time point, a frequency resource to be used by a second wireless system amongst the frequency resources;

accessing, after the first time point, the server at a second time point scheduled to reacquire the usage information from the server; and allowing, when the reacquisition at the second time point is unsuccessful, the selecting to be made based on the usage information acquired at the first time point even from the second time point onward.

* * * * *